United States Patent [19]

Kobetsky

[11] Patent Number: 4,704,799
[45] Date of Patent: Nov. 10, 1987

[54] MASTER GEAR ERROR COMPENSATION
[75] Inventor: Robert G. Kobetsky, Chicago, Ill.
[73] Assignee: Illinois Tool Works Inc., Chicago, Ill.
[21] Appl. No.: 911,476
[22] Filed: Sep. 25, 1986
[51] Int. Cl.[4] .............................................. G01B 7/28
[52] U.S. Cl. ........................... 33/179.5 R; 33/179.5 B; 33/179.5 C
[58] Field of Search ................... 33/179.5 R, 179.5 B, 33/179.5 C

[56]    References Cited
U.S. PATENT DOCUMENTS

| 3,352,023 | 11/1967 | Budnick | 33/179.5 C |
| 3,851,398 | 12/1974 | Hilburger | 33/179.5 B |
| 4,272,891 | 6/1981 | Fusari | 33/179.5 C |
| 4,488,359 | 12/1984 | Misson | 33/179.5 C |
| 4,550,508 | 11/1985 | Spaeth | 33/179.5 C |

FOREIGN PATENT DOCUMENTS

| 1599905 | 10/1981 | United Kingdom | 33/179.5 R |
| 744222 | 7/1980 | U.S.S.R. | 33/179.5 B |
| 920363 | 4/1982 | U.S.S.R. | 33/179.5 R |
| 998853 | 2/1983 | U.S.S.R. | 33/179.5 R |

Primary Examiner—Richard R. Stearns
Attorney, Agent, or Firm—John P. O'Brien; Thomas V. Buckman

[57]    ABSTRACT

A method is provided for compensating for master gear error in a gear checking apparatus employing a preselected master gear and a fixture for mounting a test gear to be checked in mesh with the master gear. The method comprises mounting a test gear in mesh with the master gear, rotatably driving one of the master and test gears, and producing a test signal corresponding to the differential movement between the master gear and test gear during rotation caused by imperfections or irregularities in both of the gears. The method proceeds by processing the test signal to form a plurality of individual error values, each corresponding to engagement of a given tooth of the master gear with several teeth of the test gear, developing a series of mean values, each corresponding to the mathematical mean of all of the error values developed with respect to a single master gear tooth during engagement thereof with each of the test gear teeth, and utilizing each of said mean values as a correction factor to compensate for master gear error. An apparatus is also provided for carrying out the foregoing method.

21 Claims, 10 Drawing Figures

MASTER GEAR ERROR COMPENSATION

BACKGROUND OF THE INVENTION

This invention is directed generally to the field of gear testing and more particularly to a novel and improved method and related apparatus for compensating for the contribution of master gear error in a gear checking apparatus.

Generally speaking, various gear testing or gear checking machines are known which utilize controlled apparatus for functional gear checking in which a highly accurate master gear is placed in mesh and rotated with the gear under test. Such gear checking machines rely on various methods and related apparatus to assure accuracy of the gear testing or checking carried out. For example, some testing machines depend upon precision drive motors and careful control of motor speeds for achieving gear checking. Other such apparatus rely on various electronic and electro-mechanical apparatus for determining various gear properties and tooth-to-tooth gear properties. All of these methods depend upon the controlled rotation of a gear under test in mesh with a highly accurate master gear.

One particularly useful type of gear checking apparatus is shown for example in U.S. Pat. No. 4,272,891 to Fusari, which is assigned to the assignee of this invention.

Generally speaking, gear testing instruments may be of the single flank or double flank variety. In the single flank type of gear testing apparatus, the master gear and gear to be tested are mounted for intermeshing in such a fashion that but one flank or side surface of each of the respective intermeshed gear teeth are in contact during the test, and the operating center-to-center distance is such that there is some "play" or what is known in the art as "backlash" between the intermeshed gear teeth. On the other hand, double flank testing systems incorporate a "floating" axis which is arranged so as to maintain some pressure of engagement between the gears in such a fashion as to maintain the respective gear teeth more fully intermeshed, such that each gear tooth of the master gear, for example, constantly engages the adjacent faces or surfaces of the gear teeth of the gear under test to either side thereof.

The foregoing Fusari patent utilizes an instrument and fixture for generating an analog type of signal corresponding to relative center-to-center movement experienced between the intermeshed gears due to irregularities or imperfections in the gear to be tested. These analog signals may be further processed by either analog or digital circuits to obtain desired quantities indicative of various composite properties of the gear under test or of individual tooth-to-tooth variations. On the other hand, some gear testing apparatus utilize analog-to-digital conversion of the signals at an early stage, relying upon digital signal processing thereafter to extract the desired quantities relative to the properties of the gear under test.

However, most of the prior art gear testing apparatus have heretofore assumed that all variations in gear rotation are due to irregularities or imperfections in the "test gear" or gear under test. That is, a highly accurate, precision master gear has been utilized in the test fixture for intermeshing with the test gear, such that it can be assumed that irregularities observed are due to imperfections in the latter. Such highly accurate, precision master gears are of course relatively difficult and expensive to produce. Moreover, even with such accurate gears, some slight inaccuracies, irregularities or imperfections may nonetheless occur. Moreover, wear and/or damage over a period of service may introduce such irregularities or inaccuracies into the precision master gear.

Accordingly, it is often the practice to remove and replace the master gear after a given period of time and/or after a given number of test gears have been checked by the master. Such replacement is relatively time-consuming and expensive.

The present invention proposes a novel method and system for both determining and compensating for master gear error in such a gear checking apparatus. Hence, the present invention obviates the necessity for providing extemely accurate precision master gears at great expense, since any errors or imperfections in the master gear can be compensated for by the apparatus and method of the invention. Moreover, the present invention makes possible periodic rechecking and recalculation of master gear error, so as to accommodate changes in master gear configuration which may occur due to wear and/or damage over a period of use.

OBJECTS OF THE INVENTION

Accordingly, it is a general object of the invention to provide a novel and improved gear testing or checking method and apparatus of the type utilizing a master gear in mesh with a gear to be tested.

A more specific object of the invention is to provide a novel method and apparatus for compensating for master gear error in the foregoing gear checking method and apparatus.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

DETAILED DESCRIPTION OF THE ILLUSTRATED EMBODIMENT

Referring now to the drawings, and initially to FIGS. 1-4, the present invention advantageously provides a method and corresponding apparatus for compensating for the contribution of master gear error in a gear checking or gear testing apparatus which employs a master gear in mesh with a test gear or "part" to be checked. Such an apparatus is indicated diagrammatically in FIG. 1, and designated generally by reference numeral 10. The apparatus 10 includes a master gear 12 and a test gear or part 14. The master gear 12 and part or test gear 14 are each mounted on a shaft or spindle 16, 18, which shafts are spaced apart by an appropriate amount to maintain the two gears 12, 14 in mesh or engagement so as to transmit rotational forces therebetween.

Figures 1, 2:
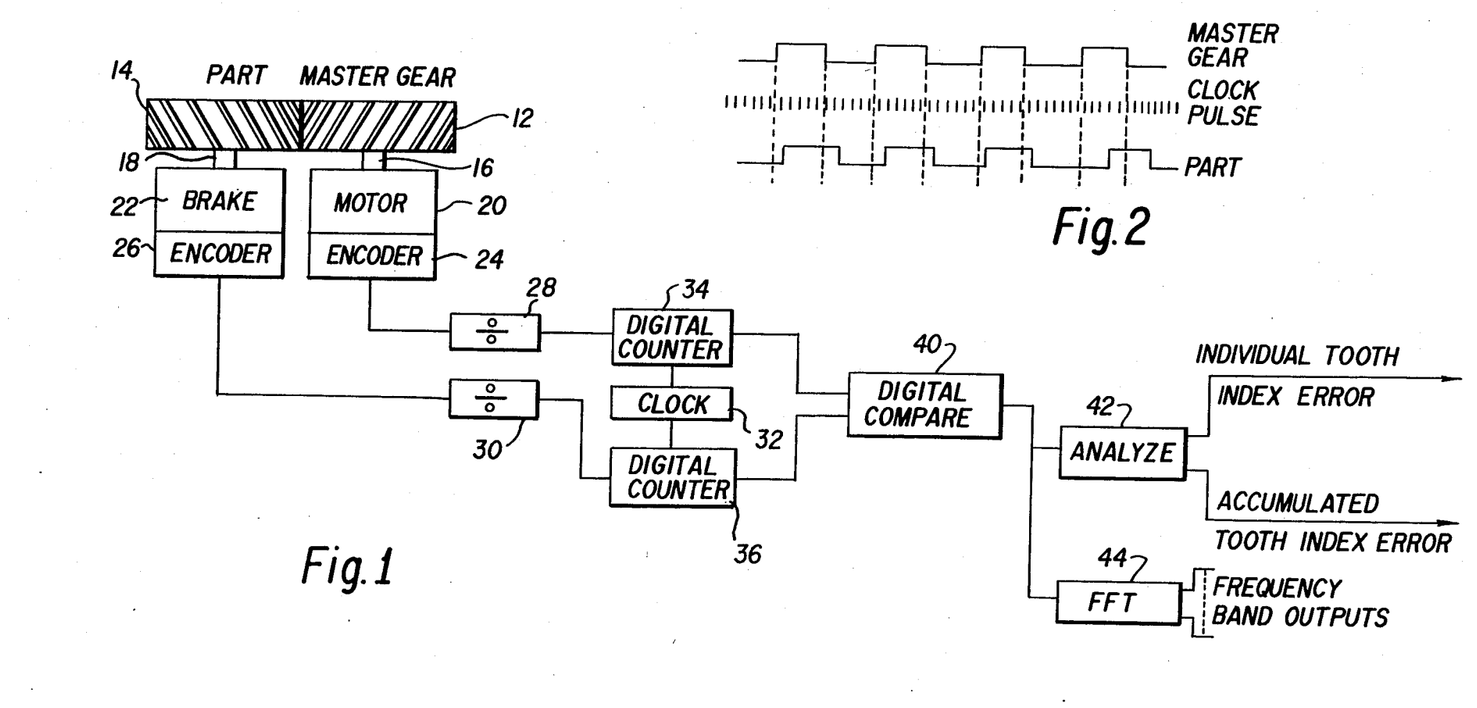
FIG. 1 is a block diagrammatic representation of a single flank gear testing apparatus in accordance with the invention.
FIG. 2 is a graphical representation of electrical signals generated in the apparatus of FIG. 1.

In accordance with the preferred form of the invention, the gears 12 and 14 and associated spindles are arranged for single flank rotation. That is, the gears 12 and 14 are arranged and intermeshed in such a way that each tooth of the master gear contacts only one side or "flank" of each tooth of the part or test gear as the two are rotated in mesh. This single flank engagement or rotation is such as to leave some play, or what is known in the art as "backlash" between the two gears.

One of the two spindles 16, 18, and preferably the master gear spindle 16 is rotated by a motor 20, so as to rotate the master gear directly. Hence, the part or test gear is rotated indirectly by the master gear, in accordance with its intermeshing with the master gear. Accordingly, the other of the two shafts or spindles, and preferably the test gear or part spindle 18 is provided with a brake 22 in order to maintain the desired single flank engagement during rotation of the two gears.

In accordance with the invention, the motor 20 and brake 22 are each provided with a digital encoder apparatus 24, 26; these digital encoders operating so as to encode the rotation of the corresponding gear into a digital pulse train having a predetermined number of pulses per revolution. As will be more fully explained hereinbelow, the method and apparatus of the invention operate by producing a differential or test signal which corresponds to differential movement between the master gear and test gear during rotation, which differential is caused by imperfection or irregularities in one or both of these gears. In the illustrated embodiment, this differential or test signal generally corresponds to the differential rotational speeds between the part or test gear and the master gear due to such irregularities or imperfections in one or both.

That is to say, if the two gears 12 and 14 were perfect cylinders in perfect rotational contact, there would be no differential rotation whatever therebetween. Rather, the part or test gear would then rotate at an exact and precise angular velocity equal to exactly the angular velocity of the master gear times the ratio of the diameters thereof. However, gears with teeth do not comprise such perfect cylinders and, moreover, some variations and irregularities are introduced into individual gears and gear teeth in their manufacture. Hence, the gears may be somewhat out of round, have various angular positional variations from tooth to tooth, and the like. Also, various imperfections may occur in the desired involute curvature or shape of the tooth surfaces during manufacture or the spacing of the gear teeth may be inaccurate.

All of these factors contribute to the existence of some differential rotation, at least on an incremental tooth-to-tooth basis, during rotation between any given two gears. That is, observation of the rotational speeds of the two gears during any given period of time will reveal that one or the other of the two gears will speed up slightly or slow down slightly from time to time relative to its expected overall rotational speed in accordance with the gear ratios between the gears. Hence, while each gear will indeed rotate one full revolution per each revolution of the other, times the gear ratio therebetween, the rotational speed will not be constant during such revolution, but will vary incrementally when observed from time to time.

Figure 9:
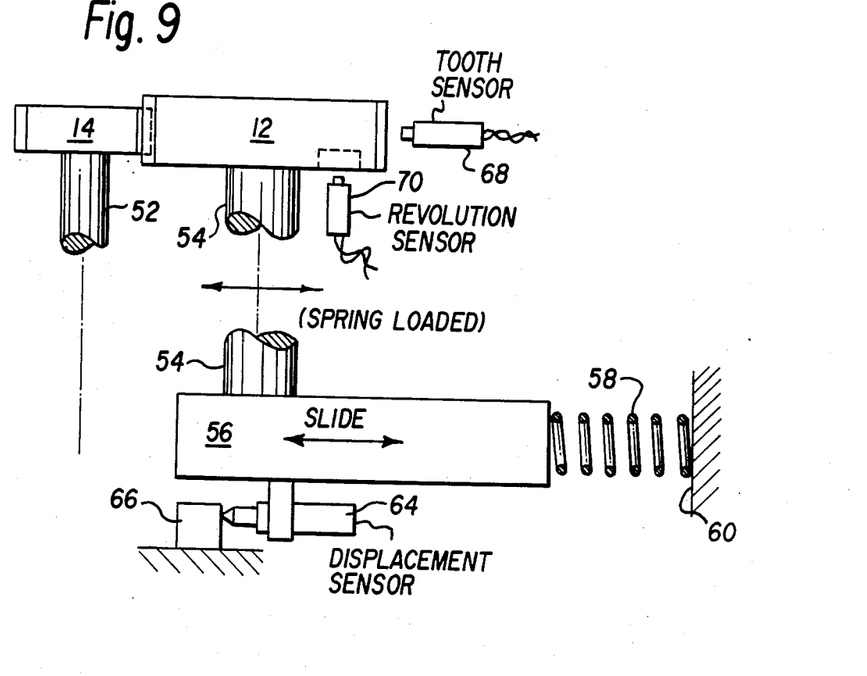
FIG. 9 is a block diagrammatic representation of a double flank gear testing apparatus in accordance with another aspect of the invention.

The present invention is shown in FIG. 1 in connection with apparatus which measures the rotational speeds of the two gears and moreover, which measures incremental differences in these rotational speeds. However, the principles of the invention may also be applied to other apparatus; for example, apparatus of the double flank variety as shown in FIG. 9. As shown and described in the above-referenced patent to Fusari, such double flank apparatus is often adapted to measure relative movement between the master gear and the test gear other than rotational differences.

That is, in double flank testing, the axis of one of the two gears is resiliently pressed toward the other such that both faces or flanks of a given gear tooth engage the opposing inwardly facing flanks of teeth of the other gear adjacent either side thereof during rotation. In such double flank test apparatus other relative movements between gears are generally measured. For example, as shown in the above-referenced patent to Fusari, relative movement between the axes of the two gears is measured. The movement measured may be that of one axis relative to the other in a straight line, while the two axes remain parallel. Also this movement may comprise rotation of one of the gear axes relative to the other. These relative movements between gears can be analyzed to determine a number of errors or imperfections in the test gear or part (the master gear is assumed not to contribute to such movements). It should be understood that the present invention may also be utilized in connection with such a double flank test apparatus.

Having measured the differential movement between the master gear and the test gear during rotation, and having associated the data obtained with individual master gear teeth, the method and apparatus of the invention proceed by developing test signals corresponding to this differential movement. These test signals are next processed to form a plurality of individual error signals, each of which corresponds to the engagement of a given tooth of the master gear with a given tooth of the test gear. Accordingly, a generally tabular array of data may be accumulated, with each data point or entry thereof corresponding to a value associated with the engagement of one of the teeth of the master gear with one of the teeth of the test gear. This data is accumulated until a plurality of teeth of the master gear have contacted a plurality of teeth the test gear and a corresponding error signal has been produced. Such a tabular arrangement of data is shown, for example, in the accompanying Table I which appears at the end of the description.

It should be noted that it is not necessary that each tooth of the master gear contact every tooth of the test gear. It is necessary only that enough random data be obtained from the test operation on a given test gear to enable the calculation of a meaningful average of the values.

Referring briefly to Table I, each horizontal row of data corresponds to the engagement of one of the master teeth with each of the part or test gear teeth in succession. Hence, each vertical column of data conversely corresponds to engagement with a given tooth of the part or test gear with each of the master gear teeth in succession. It should be understood that this tabular arrangement of data has been made and set forth herein for purposes of understanding the invention; however, such a table need not be physically assembled in the form illustrated by the apparatus of the invention in order to carry out the method of the invention. Rather, it is only necessary to identify the stream of data generated by the encoders 24, 26 in terms of a given master gear tooth and test gear tooth to which each item of data corresponds.

We have recognized that each of the "error signal" data of Table I corresponds to an error or variation which is due in part to the test gear or part under test, and in part to the master gear. Accordingly, by organizing the data in the tabular form shown in Table I, we have determined that the "constant" component of the data in any horizontal row; i.e., the row average or mean is in fact the master gear contribution to the error data, while the "variable" component of the data (the range) is the contribution from the various teeth of the part or test gear.

After obtaining and organizing the data as just described, the method and apparatus of the invention next proceeds by developing a series of mean values, each corresponding to the mathematical mean of all of the error signals developed with respect to a single master gear tooth during engagement thereof with each of the test gear teeth. Thereafter, the method and apparatus of the invention utilizes each of these mean values as a correction factor to compensate for master gear error. More specifically, and with reference to Table I, the mean signal value developed for each master gear tooth (under the the column heading "AVERAGE") may be directly mathematically subtracted from the error signal value obtained for each part or test gear tooth in mesh with that master gear tooth. This results in the error signal being in effect corrected or compensated for the effect or contribution of the master tooth to that signal, leaving only the effect or contribution of the test gear or part. This advantageous result effectively eliminates the effect of the master gear from the test results, leading to a much more accurate checking or testing of the test gear or part.

Referring again to FIG. 1, the apparatus of the invention utilizes digital divider or equivalent means, here diagrammatically indicated at 28, 30 for correcting or compensating the two pulse trains produced by encoders 24, 26. That is, the pulse trains are compensated as necessary to obtain corrected pulse trains having the same "frequency" or number of pulses per unit time, to thereby take out the effect of the gear ratio on the frequency or pulses per unit time produced by each of the encoders in response to its associated gear. In theory, if the two gears 12, 14 were perfect cylinders in perfect engagement, the corrected pulse trains thus produced by divider means 28 and 30 would be exactly equal in frequency and constant phase at all times. However, as mentioned above, actual gears speed up and slow down relative to each other during relative rotation. Hence, the corrected pulse trains produced by dividers 28 and 30, while equal in frequency will be observed to have phase differences or offsets on a pulse-by-pulse basis. This is illustrated in FIG. 2, wherein although the same number of pulses are produced over the same interval of time as to both pulse trains, it will be seen that individual ones of the pulses are relatively offset or out of phase by varying amounts. An additional high frequency clock pulse, generated as described below, further quantifies this offset or phase difference between respective pulses of the two pulse trains.

Accordingly, the apparatus and method of the invention produces individual error signals by measuring the differences or offsets in phase between the individual pulses on a pulse-by-pulse basis. This is accomplished by generating a high frequency clock pulse signal at an oscillator or oscillator means or clock circuit 32. This high frequency clock pulse signal is then applied to a pair of digital counter circuits 34, 36 which receive the respective corrected pulse trains from divider circuits 28 and 30. Each of these digital counters may then be triggered or activated by each pulse of the incoming corrected pulse train to provide a digital count of the clock signal during each pulse and hence corresponding to the length of the pulse. The two counts may then be compared in a digital comparator circuit means 40, which produces an output or comparison signal equal to the difference between respective counts on a pulse-by-pulse basis. This comparator or difference signal then corresponds to the respective offset or phase error or difference between the pulses of the two pulse trains on a pulse-by-pulse basis.

Each of the counts or error signals thus developed by digital comparator 40 may also be related or assigned to a given master tooth and a given part or test gear tooth by counting the pulses from the encoders 24 and 26. That is, the number of teeth of each gear and the nominal rotational velocity of motor 20, as well as the number of pulses produced by each encoder per revolution and hence, per gear tooth, are all known quantities. Accordingly, the data stream from the comparator may readily be related to the individual master gear teeth and part or test gear teeth. Alternatively, the circuit could be modified to operate by counting the clock pulse signals during successive incremental time intervals corresponding to the phase difference or offset between pulses of the two corrected pulse trains on a pulse-by-pulse basis. For example, the counter would be triggered on corresponding leading or falling edges of the pulses to "count" the offset therebetween.

In the apparatus and method in accordance with the invention, such individual gear tooth data may be extracted from the output of digital comparator 40 by an analysis or computing circuit means 42. Moreover this computing circuit means operates to determine the mean of all of the error signals developed for each master gear tooth during its contact with each test or part gear tooth. Preferably, the computing circuit means 42 additionally automatically subtracts the value of this mean signal from each of the error signals developed with respect to the same master gear tooth to produce corrected error signals for each tooth of each test gear or part for the part or test gear 14, as well as for any further part or test gear subsequently checked by meshing with the same master gear 12. That is, once the necessary mean correction data is established for a given master gear 12, this same data may be utilized if desired to obtain corrections for subsequent test gears or parts, without recalculating the master gear correction data. However, the correction data for master gear 12 may be recalculated by the same method described above from time to time in order to assure continuing accuracy of the data and to compensate for any wear or damage or other change which may occur to the master gear over a period of service.

In accordance with the preferred form of the invention illustrated, an additional transformation circuit or means 44 may also be provided as a part of the computing means to generate so-called Fast Fourier Transform (FFT) information from the error data produced by the comparator means 40. Stated in simplest terms, the Fast Fourier Transform technique essentially converts the time dependent or time domain data from the foregoing system into the frequency domain, an alternative form. This in effect results in filtering or summarizing of complex signal information, providing further practical and useful data regarding the part or gear under test. This transform circuit may have a plurality of so-called frequency band outputs, which may be compared with standardized data to determine further particulars of test or part gear configuration and performance. The analysis of gears using the present invention greatly simplifies the use of Fast Fourier Transform (FFT) techniques. Because the FFT techniques require data to be in digital form, and because the data using the present invention is initially obtained in digital form, no extra time-consuming analog-to-digital conversion is necessary.

In similar fashion, the computing or analysis circuit portion 42 may also further analyze or manipulate the corrected error data to determine other useful data regarding the test gear or parts such as individual tooth index error and/or accumulated tooth index error. Advantageously, all of this data is already compensated in accordance with the invention to remove the effect or contribution of the master gear 12 thereto, thus comprising a more accurate representation of test gear or part characteristics.

Figure 3:
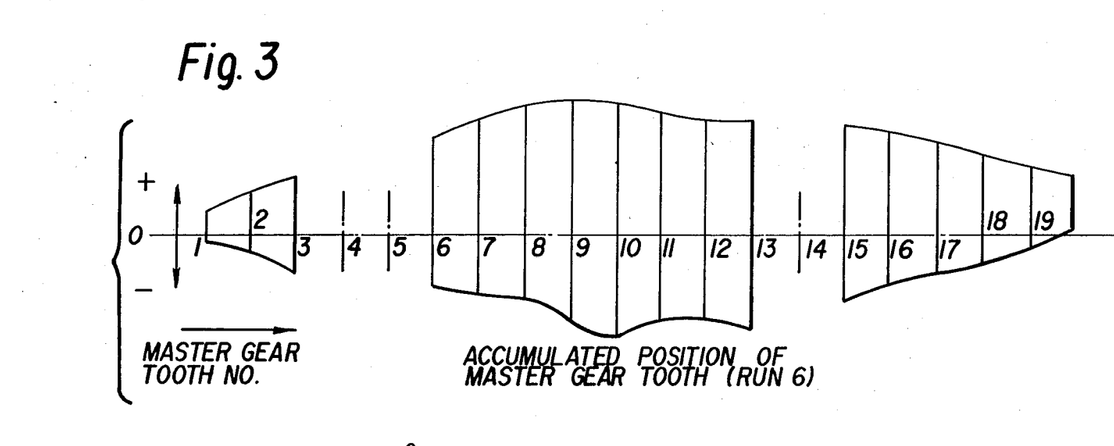
FIG. 3 is a graphical representation of data accumulated in accordance with the method and apparatus of the invention and apparatus of FIG. 1.

By way of specific example, FIGS. 3–8 illustrate a number of graphical representations of data collected and arranged in the fashion described hereinabove in accordance with the invention. In FIG. 3, a graphical representation illustrates the error signals developed by each tooth of a 20-tooth master gear during engagement with many teeth of a given test gear or part. For purposes of more clearly demonstrating the effect of master gear error on the data, the master gear utilized in accumulating the "Run 6" data of FIGS. 3 and 4, had the number 4 and 14 teeth thereon purposely deformed somewhat by the addition of foreign material. The amount of deformation created was great enough on tooth 4 to cause a substantial "carry-over" effect on the data associated with tooth 5.

As shown in FIG. 3, the offset or error data with respect to each test gear tooth begins and ends at essentially 0 error upon one full revolution of the test gear. The cumulative positional rotational error for each rotation must of course be zero, since the first tooth or "tooth 1" will again be in the same position in which it started at the beginning of a rotation. The graph of FIG. 3 represents cumulative or accumulated positional error data. That is to say, the amount of error of tooth 3 is additive with respect to the amount of error of tooth 2, and so forth. Hence, position 1 of the graph of FIG. 3 contains the error data for master gear tooth No. 1 against each and every one of the part or test gear teeth, and so forth. However, it will be seen that the purposely deformed master gear teeth, Nos. 4 and 14, caused the cumulative error data to go off scale.

Figure 4:
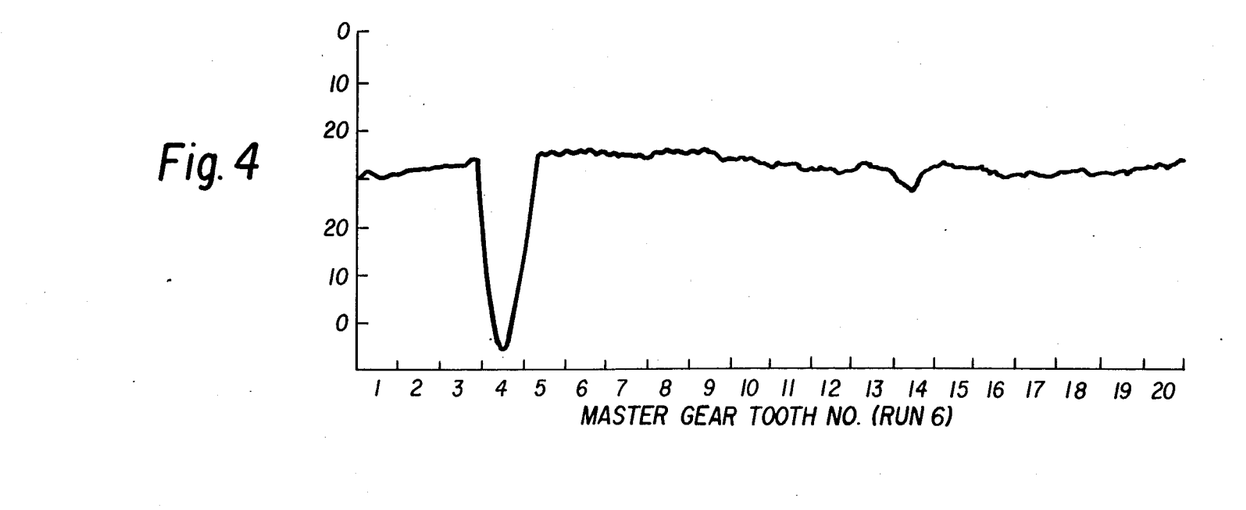
FIG. 4 is a further graphical representation of data accumulated with the apparatus of FIG. 1 in accordance with the invention.

Similar data is also illustrated in FIG. 4, which is a graphical representation of the cumulative error from a single test run of the "deformed" master gear with the test gear. In FIG. 4, the data for master teeth 4 and 5 will be seen to be considerably offset, and that for tooth 14, somewhat offset from the remaining data, due to the intentional deformation of these teeth. However, since the master gear is a relatively accurate, precision gear, normally the error or positional variation data does not extend over a very great range, aside from the data for intentionally or otherwise deformed, damaged or worn teeth. That is, each master gear tooth produces data substantially similar to each other master gear tooth.

Figure 5:
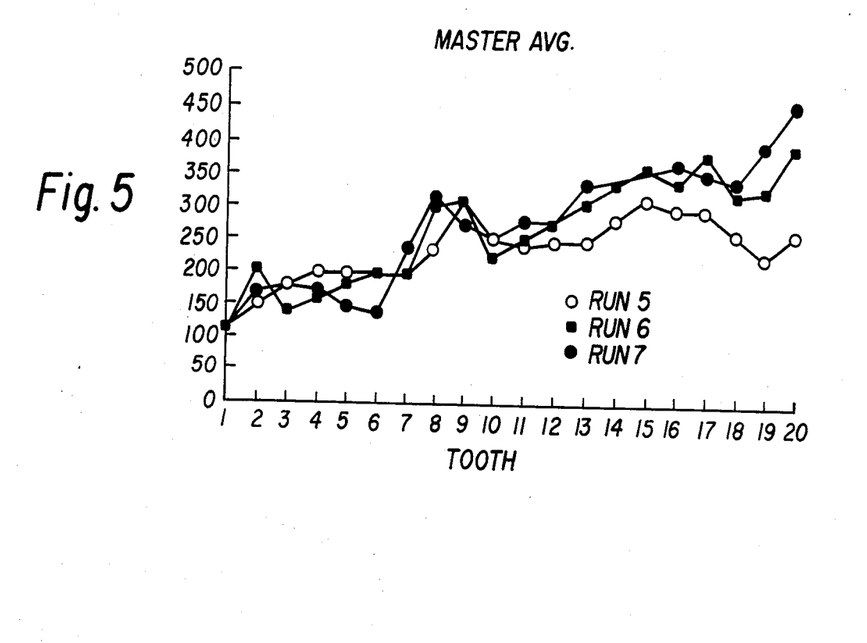
FIGS. 5-8 are graphical representations of various, average, mean and standard deviation data accumulated in accordance with the method and apparatus of the invention.
Figure 6:
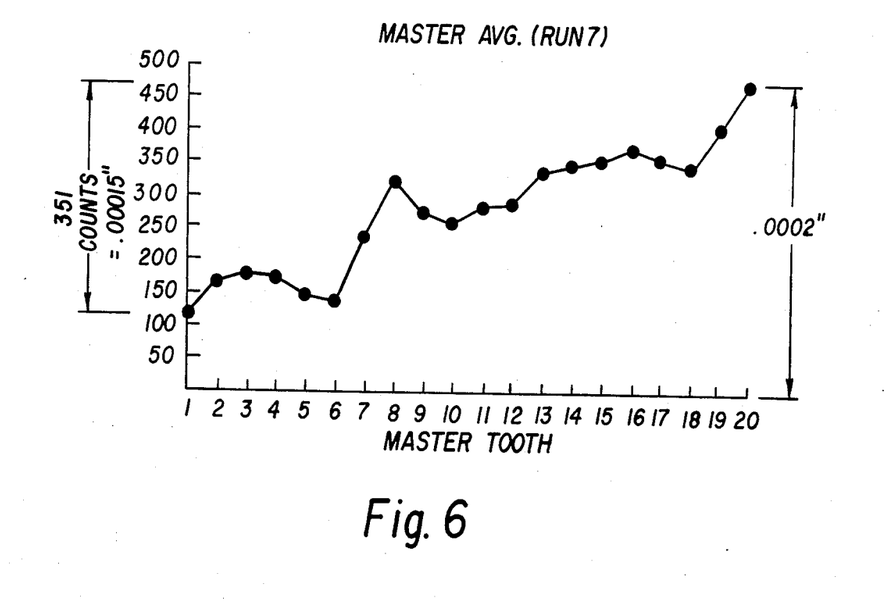

FIG. 5 illustrates the mean or average value for each master gear tooth over several runs of a given master gear in connection with several different test gears or parts. These runs are identified as "Run 5", "Run 6" and "Run 7", respectively. It will be noted that FIGS. 3 and 4 also depict data for the same "Run 6". FIG. 6 illustrates a single run ("Run 7") of the master gear, with the mean error value for each tooth being plotted. This graph is the same as the graph indicated by the like identified "Run 7" reference points in FIG. 5, and more clearly illustrates the single run data therefrom.

Figure 7:
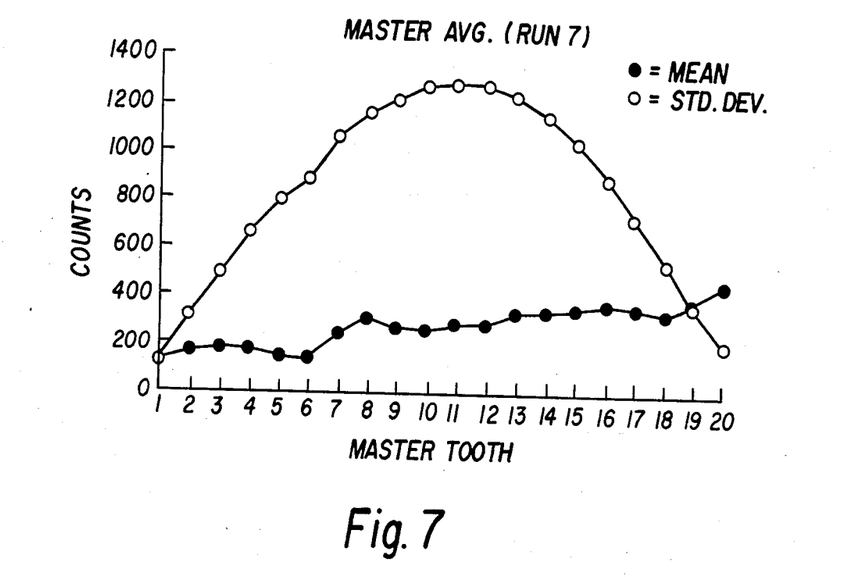

FIG. 7 illustrates both the mean and standard deviation of the data taken from a run (the same "Run 7" as above) of a given master gear against a given part or test gear. It will be seen that the mean information does not vary about a very great range, which is to be expected from the relative precision of the master gear. On the other hand, the standard deviation, which represents the part or test gear contribution, varies considerably from tooth to tooth, reflecting the cumulative imperfections and hence offsets or rotational speed variations during rotation of the same relative to the master gear.

Figure 8:
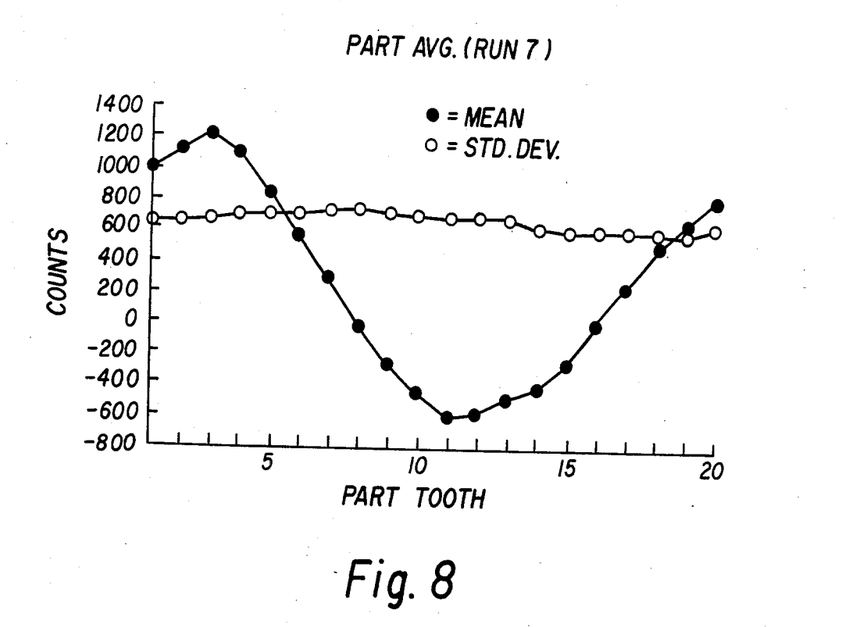

Conversely, FIG. 8 shows the mean of the part data against the standard deviation of the master gear data for the same "Run 7". Again, the standard deviation of the master gear data, as expected, varies only over a relatively small range given the precision of the master gear. However, the mean of the part data again varies considerably over the course of revolutions with the master gear, due to the relatively greater irregularities and imperfections in a typical test gear or piece part.

In the illustrated embodiment, including the test data represented in the graphical illustrations, the encoders 24, 26 were arranged to produce substantially 51 pulses per tooth of the master gear during its engagement with each tooth of the work or test gear or part.

At the rotational speeds utilized with the two gears enmeshed, the encoding rate resulted in pulse trains of a frequency in the 10 kilohertz range. Accordingly, a clock or oscillator pulse rate of on the order of 9.8 megaherz was utilized in order to finely discriminate or count the offsets or differences between individual pulses, on a pulse-by-pulse basis, of the pulse trains produced by the encoders. However, it should be understood that other frequencies of operation may be utilized without departing from the invention, the foregoing being by way of particular example only.

Figure 10:
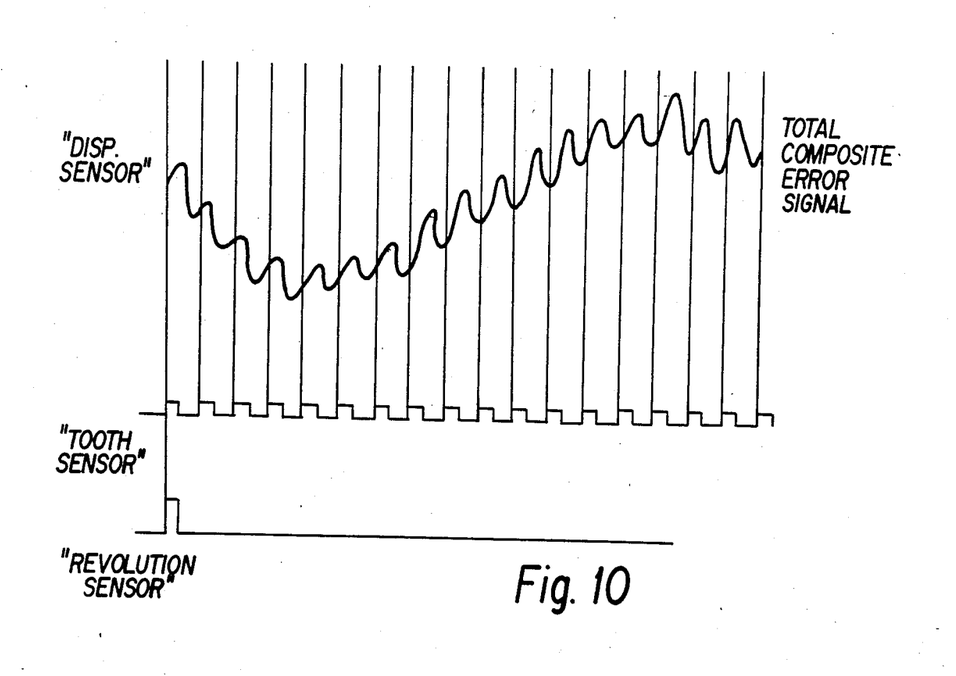
FIG. 10 is a graphical representation of electrical signals generated in the apparatus of FIG. 9.

Reference is now invited to FIGS. 9 and 10, which illustrate one example of a double flank gear testing system with which the method and apparatus of the invention might advantageously be utilized. The double flank system is designated generally by the reference numeral 50. As previously discussed, in the double flank testing arrangement, the axes or shafts of the master gear and test gear are resiliently urged together, such that each gear tooth of the master gear constantly engages the adjacent faces or surfaces of the gear teeth of the test gear to either side thereof.

Accordingly, in FIG. 9, the fixture employs a relatively fixed shaft 52 for mounting a test gear 14 and a relatively movable shaft 54 for mounting the master gear 12. This latter movable shaft 54 is in turn mounted to a slidable base support member or "slide" 56 which is fixed in the vertical plane but free to move in the horizontal plane as indicated by the double arrows thereupon. The horizontal movement is further restricted or controlled by the provision of resilient means such as a compression spring member 58, or other suitable means, which bears against one side of the slide or base 56. This spring 58 bears, at its opposite end, against a fixed wall or abutment surface 60. Accordingly, the resilient member or spring 58 resiliently urges the slide and hence the shaft 54 generally toward the shaft 52 to accomplish the desired double flank engagement between the master gear 12 and test gear 14. The master gear is preferably rotated by a motor similar to that indicated in FIG. 1, but the motor or other drive means has not been again illustrated in FIG. 9.

In the double flank system, relative shaft displacements between the shafts 52 and 54 are measured as a measure of gear error, rather than rotational variations as in the single flank system discussed hereinabove. Accordingly, one such measurement is obtained as illustrated in FIG. 9 by a displacement sensor 64 which measures the displacement of the slide 56, and hence of the shaft 54 mounted thereto from some fixed reference point or location 66. It will be noted that displacements in other directions may also be measured, the foregoing being by way of example only. Moreover, it should be understood that other fixtures may be utilized to achieve the desired double flank test arrangement without departing from the invention.

In accordance with the invention, novel means are provided for identifying the individual master gear teeth, in order to provide a means for tabulating the test data on the "tooth-by-tooth" basis described hereinabove. In the exemplary arrangement illustrated, this identification means takes the form of a tooth sensor 68 which may comprise an electromagnetic proximity type of sensor arranged to produce an identifiable change in signal level or "pulse" in response to the passage of each tooth of the master gear 12 thereby. In this manner, the data obtained from the displacement sensor 64 can be related to each individual tooth of the master gear 12 to arrange the data in a generally tabular form as discussed hereinabove. Having arranged the data in such tabular form, the determination of the master gear error contribution can be carried out in the same manner as previously described.

As an additional feature, a further revolution sensor 70, which may comprise a proximity-type sensor similar to sensor 68 may also be provided to identify a "signature" or some other identification code on the master gear 12. Such a signature or identification code can be utilized to recall compensation data previously calculated for the identified master gear 12 for later utilization if desired. For example, should different master gears or tests be run using the same fixture, data for a number of different master gears might be developed, and automatically recalled as each of these gears is identified by the sensor 70 preparatory to commencing a test procedure. On the other hand, the data may also be utilized to compare with more recently obtained data as a check or verification, or to indicate wear or other deformation of the master gear over time, and possibly to indicate the need to replace the master gear periodically.

Referring briefly to FIG. 10, the indicated data includes the pulses of the revolution sensor 70 and tooth sensor 68 and the corresponding composite error signals data collected from the displacement sensor. The arrangement of data from the displacement sensor will be seen to closely parallel the pulses from the tooth sensor, thus clearly relating individual segments of the composite error signal or data with individual teeth of the master gear.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the spirit and scope of the invention.

TABLE I

| Master Gear Tooth No. | Part Tooth No. P1 | P2 | P3 | P4 | P5 | P6 | P7 | P8 |
|---|---|---|---|---|---|---|---|---|
| 1 | 181 | 256 | 270 | 188 | 138 | 220 | −31 | −20 |
| 2 | 278 | 419 | 517 | 518 | 476 | 240 | 193 | 8 |
| 3 | 468 | 345 | 558 | 604 | 642 | 364 | 97 | 67 |
| 4 | −5397 | −5327 | −5396 | −5104 | −5071 | −5226 | −5648 | −5731 |
| 5 | −344 | −240 | −111 | −130 | −87 | −11 | −345 | −696 |
| 6 | 425 | 755 | 914 | 1078 | 1004 | 969 | 823 | 550 |
| 7 | 228 | 539 | 950 | 1063 | 1327 | 957 | 852 | 762 |
| 8 | 571 | 415 | 874 | 1273 | 1322 | 1439 | 996 | 878 |
| 9 | 396 | 739 | 581 | 1102 | 1505 | 1290 | 1338 | 1039 |
| 10 | 379 | 449 | 808 | 685 | 1230 | 1441 | 1126 | 1146 |
| 11 | 107 | 481 | 697 | 1000 | 896 | 1268 | 1379 | 1108 |
| 12 | −56 | 269 | 649 | 890 | 1254 | 880 | 1254 | 1294 |
| 13 | −345 | 139 | 492 | 841 | 1094 | 1320 | 771 | 1246 |
| 14 | −1216 | −923 | −390 | −5 | 338 | 460 | 548 | 112 |
| 15 | −174 | −344 | 103 | 554 | 917 | 1066 | 1054 | 1217 |
| 16 | −343 | −75 | −134 | 289 | 770 | 833 | 929 | 959 |
| 17 | −434 | −171 | 140 | 127 | 532 | 806 | 827 | 935 |
| 18 | −64 | −353 | −13 | 266 | 294 | 482 | 609 | 765 |
| 19 | 232 | 89 | −159 | 203 | 473 | 299 | 384 | 574 |

TABLE I-continued

| 20 | 248 | 372 | 421 | 98 | 526 | 479 | 300 | 375 |

| Master Gear Tooth No. | Part Tooth No. P9 | P10 | P11 | P12 | P13 | P14 | P15 | P16 |
|---|---|---|---|---|---|---|---|---|
| 1 | 61 | 2 | 46 | 77 | 69 | 279 | −86 | 23 |
| 2 | −60 | −15 | −178 | −21 | 267 | 240 | 270 | −198 |
| 3 | −140 | −353 | −298 | −405 | −33 | 271 | 80 | −16 |
| 4 | −5784 | −6071 | −6361 | −6272 | −6122 | −5798 | −5628 | −6002 |
| 5 | −843 | −923 | −1300 | −1548 | −1248 | −1267 | −893 | −785 |
| 6 | 135 | −149 | −307 | −629 | −722 | −313 | −390 | −339 |
| 7 | 439 | 6 | −353 | −492 | −550 | −673 | −405 | −624 |
| 8 | 765 | 371 | −86 | −448 | −310 | −417 | −689 | −573 |
| 9 | 748 | 632 | 135 | −220 | −443 | −246 | −549 | −939 |
| 10 | 889 | 446 | 297 | −37 | −229 | −531 | −438 | −851 |
| 11 | 1072 | 733 | 234 | 142 | 135 | −134 | −641 | −689 |
| 12 | 1055 | 874 | 537 | 105 | 224 | 221 | −195 | −907 |
| 13 | 1240 | 924 | 659 | 420 | 222 | 298 | 162 | −435 |
| 14 | 582 | 527 | 129 | −129 | −99 | −374 | −538 | −725 |
| 15 | 686 | 1005 | 992 | 603 | 560 | 540 | 280 | −61 |
| 16 | 1126 | 498 | 756 | 773 | 658 | 556 | 419 | 14 |
| 17 | 869 | 1036 | 336 | 600 | 879 | 739 | 488 | 210 |
| 18 | 793 | 584 | 737 | 130 | 555 | 888 | 567 | 186 |
| 19 | 694 | 621 | 385 | 550 | 233 | 596 | 786 | 358 |
| 20 | 522 | 582 | 488 | 310 | 691 | 370 | 520 | 567 |

| Master Gear Tooth No. | Part Tooth No. P17 | P18 | P19 | P20 | MAX | MIN | AVER. | STD DEV | RANGE |
|---|---|---|---|---|---|---|---|---|---|
| 1 | 138 | 193 | 153 | 100 | 279 | −86 | 112.75 | 105.72 | 365 |
| 2 | −14 | 371 | 359 | 381 | 518 | −198 | 202.55 | 226.91 | 716 |
| 3 | −306 | 74 | 378 | 414 | 642 | −405 | 140.55 | 330.02 | 1047 |
| 4 | −5997 | −5816 | −5712 | −5425 | −5071 | −6361 | −5694.40 | 375.03 | 1290 |
| 5 | −1167 | −847 | −1030 | −604 | −11 | −1548 | −720.95 | 467.43 | 1537 |
| 6 | −51 | −95 | 178 | 114 | 1078 | −722 | 197.50 | 578.91 | 1800 |
| 7 | −501 | 86 | 25 | 335 | 1327 | −673 | 198.55 | 641.11 | 2000 |
| 8 | −652 | −260 | 229 | 266 | 1439 | −689 | 298.20 | 699.83 | 2128 |
| 9 | −745 | −443 | −96 | 402 | 1505 | −939 | 311.30 | 743.50 | 2444 |
| 10 | −1154 | −695 | −443 | −24 | 1441 | −1154 | 224.70 | 759.81 | 2595 |
| 11 | −888 | −907 | −651 | −238 | 1379 | −907 | 255.20 | 751.87 | 2286 |
| 12 | −830 | −685 | −782 | −494 | 1294 | −907 | 277.85 | 742.98 | 2201 |
| 13 | −1051 | −643 | −563 | −611 | 1320 | −1051 | 308.90 | 719.22 | 2371 |
| 14 | −1260 | −1459 | −1247 | −1076 | 582 | −1459 | 337.25 | 684.04 | 2041 |
| 15 | −149 | −400 | −749 | −388 | 1217 | −749 | 365.60 | 596.99 | 1966 |
| 16 | −272 | −13 | −300 | −616 | 1126 | −616 | 341.35 | 518.62 | 1742 |
| 17 | −49 | −112 | 64 | −109 | 1036 | −434 | 385.65 | 441.46 | 1470 |
| 18 | −34 | 85 | −82 | 145 | 888 | −353 | 327.00 | 352.04 | 1241 |
| 19 | 47 | 132 | 104 | 69 | 786 | −159 | 333.50 | 251.58 | 945 |
| 20 | 328 | 315 | 228 | 295 | 691 | 98 | 401.75 | 143.81 | 593 |

The invention is claimed as follows:

1. A method of compensating for the contribution of master gear error in a gear checking apparatus employing a preselected master gear and a fixture for mounting a test gear to be checked in mesh with said master gear, said method comprising:

mounting a test gear in mesh with said master gear; rotatably driving one of said master and test gears; producing a test signal corresponding to differential movement between the master gear and test gear during rotation caused by imperfections or irregularities in one or both of the gears;

processing said test signal to form a plurality of individual error values, each corresponding to engagement of a given tooth of the master gear with a given tooth of the test gear;

developing a series of mean values, each corresponding to the mathematical mean of all of the error values developed with respect to a single master gear tooth during engagement thereof with each of the test gear teeth;

and utilizing each of said mean values as a correction factor to compensate for master gear error.

2. A method according to claim 1 wherein the step of mounting comprises mounting the test gear to a test fixture for achieving single flank engagement with the master gear.

3. A method according to claim 1 wherein the step of mounting comprises mounting the test gear to a test fixture for achieving double flank engagement with the master gear.

4. A method according to claim 1 wherein the step of producing a test signal comprises the steps of digitally encoding the motion of each of said master gear and said test gear into a corresponding pulse train having a predetermined number of pulses per gear revolution; compensating the two pulse trains as necessary to obtain two pulse trains having the same number of pulses per unit time; and developing said error values as a function of phase differences between pulses of the two corrected pulse trains.

5. A method according to claim 4 wherein the step of developing said error signals comprises the steps of generating a high frequency clock pulse signal and counting the pulses of said high frequency clock pulse signal during successive incremental time intervals corresponding to the phase difference between individual pulses of the two corrected pulse trains on a pulse-by-pulse basis; and wherein developing said mean values includes calculating the mean of the counts taken for each master gear tooth with respect to all of the test gear teeth.

6. A method according to claim 1 wherein the step of utilizing said mean values as a correction factor comprises the steps of subtracting the mean value developed for each master gear tooth from each error value developed for that master gear tooth in contact with a test gear tooth.

7. Apparatus for compensating for master gear error in a gear checking apparatus employing a preselected master gear comprising:
   a fixture for mounting a test gear to be checked in mesh with said master gear;
   drive means for rotatably driving one of said master and test gears;
   signal generating means responsive to differential movement between the master and test gears for producing a test signal corresponding to said differential movement between the gears during rotation thereof caused by imperfections or irregularities in both of the gears;
   signal processing circuit means for processing said test signal to form a plurality of individual error signals, each corresponding to engagement of a given tooth of the master gear with a given tooth of the test gear;
   and computing means for developing a series of mean signals, each corresponding to the mathematical mean of all of the error signals developed with respect to a single master gear tooth during enengagement with a plurality of the test gear teeth, and for applying each of said mean signals to the error signals developed for the corresponding master gear tooth to compensate for master gear error.

8. Apparatus according to claim 7 wherein said fixture comprises a pair of spaced apart, fixed shafts for mounting the test gear for single flank engagement with the master gear.

9. Apparatus according to claim 7 wherein said fixture comprises a pair of spaced apart shafts and resilient means for resiliently urging at least one of said shafts toward the other to achieve double flank engagement between the master gear and the test gear.

10. Apparatus according to claim 9 wherein said signal generating means comprises displacement sensor means operatively associated with said on of said shafts urged by said resilient means for continuously determining the displacement thereof relative to a fixed reference point during relative rotation between the master gear and test gear.

11. Apparatus according to claim 10 wherein said signal generating means further includes tooth sensor means operatively associated with said master gear for producing an identifiable incremental pulse signal corresponding to the passage of each master gear tooth relative to a fixed reference point during rotation thereof.

12. Apparatus according to claim 11 wherein said signal processing circuit means further includes means for relating the signals from said tooth sensor means to the signals from said displacement sensor means to achieve said correspondence of each error signal with a given tooth of the master gear.

13. Apparatus according to claim 7 wherein said signal generating means comprises digital encoder means operatively coupled with said test fixture for digitally encoding the motion of each of said master gear and said test gear into a corresponding pulse train having a predetermined number of pulses per gear revolution.

14. Apparatus according to claim 13 wherein said test circuit means further comprises divider circuit means coupled to said digital encoder means for compensating the two pulse trains as necessary to obtain corrected pulse trains having the same number of pulses per unit time, and wherein said signal processing circuit means includes error signal generating circuit means for developing said error signal as a function of the phase difference between the two said corrected pulse trains on a pulse-by-pulse basis.

15. Apparatus according to claim 14 wherein said error signal generating circuit means comprises oscillator means for generating a high frequency clock pulse signal and digital counter circuit means for counting the high frequency clock pulses during successive incremental time intervals corresponding to the phase differences between individual pulses of the two corrected pulse trains on a pulse-by-pulse basis.

16. Apparatus according to claim 15 wherein said digital counter circuit means includes counting circuits for producing successive digital counts of the high frequency clock pulses corresponding to the pulse width of each pulse of each of said corrected pulse trains and digital comparator circuit means for comparing said digital counts of the high frequency clock pulses and for producing therefrom a further signal corresponding to said phase differences between the respective pulse trains on a pulse-by-pulse basis 17. Apparatus according to claim 7 wherein said computing means comprises means for subtracting the value of the mean signal developed for each master gear tooth from each error signal developed for that master gear tooth in contact with any test gear tooth of any test gear to be checked by meshing with the same said master gear.

18. Apparatus according to claim 7 wherein said computing means further includes transform means for converting said test signal from a time domain signal to a frequency domain signal in accordance with a predetermined Fast Fourier Transform function, so as to provide a plurality of output signals having a predetermined relation to test gear properties.

19. A digital gear checking apparatus employing a pre-selected master gear and a fixture for mounting a test gear to be checked in mesh with said master gear, said apparatus comprising:
   a fixture for mounting a test gear to be checked in mesh with said master gear;
   drive means for rotatably driving one of said master and test gears;
   digital signal generating means responsive to differential movement during rotation between the master gear and test gear for producing digital signals corresponding to said differential movement; signal processing means for relating said digital signals to individual master gear teeth to determine the mean of all of the error signals developed for each master gear tooth;
   and computing means coupled to said signal processing means for subtracting the value of said mean signal from each of the error signals developed with respect to the same master gear tooth to produce corrected error signals for each tooth of said test gear.

20. Apparatus according to claim 19 wherein said digital signal generating means comprise high resolution optical incremental encoders coupled on axis with each of the test gear and the master gear.

21. Apparatus according to claim 19 and further including digital circuit means capable of performing Fast Fourier Transform functions upon the data from said signal processing means to thereby transform the time dependent data into frequency dependent data.

* * * * *